(12) United States Patent
Otake et al.

(10) Patent No.: US 7,159,384 B2
(45) Date of Patent: Jan. 9, 2007

(54) REGENERATION CONTROL OF DIESEL PARTICULATE FILTER

(75) Inventors: Makoto Otake, Yokohama (JP);
Junichi Kawashima, Yokosuka (JP);
Naoya Tsutsumoto, Yokohama (JP);
Terunori Kondou, Yokohama (JP);
Shouichirou Ueno, Yokohama (JP);
Takao Inoue, Yokohama (JP);
Toshimasa Koga, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 93 days.

(21) Appl. No.: 11/010,348

(22) Filed: Dec. 14, 2004

(65) Prior Publication Data

US 2005/0126161 A1 Jun. 16, 2005

(30) Foreign Application Priority Data

Dec. 15, 2003 (JP) ............................. 2003-416042
Dec. 15, 2003 (JP) ............................. 2003-416056

(51) Int. Cl.
*F01N 3/00* (2006.01)

(52) U.S. Cl. ..................... 60/277; 60/274; 60/295; 60/297

(58) Field of Classification Search ................ 60/274, 60/277, 278, 280, 287, 291, 295, 297, 311
See application file for complete search history.

(56) References Cited

U.S. PATENT DOCUMENTS

| | | | | |
|---|---|---|---|---|
| 5,195,316 | A * | 3/1993 | Shinzawa et al. ............. | 60/274 |
| 6,090,187 | A * | 7/2000 | Kumagai ..................... | 95/278 |
| 6,247,311 | B1 | 6/2001 | Itoyama et al. | |
| 6,644,022 | B1 * | 11/2003 | Hirota et al. .................. | 60/297 |
| 6,973,778 | B1 * | 12/2005 | Kondou et al. ............... | 60/295 |
| 6,990,802 | B1 * | 1/2006 | Itoyama et al. ............... | 60/295 |
| 7,021,050 | B1 * | 4/2006 | Nishimura et al. ............ | 60/295 |
| 2002/0196153 | A1 | 12/2002 | Kinugawa et al. | |
| 2003/0126858 | A1 | 7/2003 | Strohmaier et al. | |

FOREIGN PATENT DOCUMENTS

| | | |
|---|---|---|
| FR | 2 804 177 A1 | 7/2001 |
| FR | 2 832 758 A1 | 5/2003 |
| JP | 2002-227634 A | 8/2002 |
| JP | 2002-295240 A | 10/2002 |
| JP | 2003-106140 A | 4/2003 |

OTHER PUBLICATIONS

U.S. Appl. No. 11/003,349, filed Dec. 6, 2004, Tsutsumoto et al.

* cited by examiner

*Primary Examiner*—Binh Q. Tran
(74) *Attorney, Agent, or Firm*—Foley & Lardner LLP

(57) ABSTRACT

A diesel particulate filter (41) which traps particulate matter contained in the exhaust gas of a diesel engine (1) comprises an oxidation catalyst (41A) which exhibits a temperature-raising effect during regeneration of the filter (41). A controller (31) calculates the amount of particulate matter trapped in the filter (41) at the start of regeneration as a first amount, and calculates the amount of particulate matter burned during regeneration of the filter (41) as a second amount (S3, S10, S18). A deterioration factor d of the oxidation catalyst is calculated from the ratio of the second amount and first amount, and a target temperature for the next regeneration of the filter is determined on the basis of this deterioration factor d. Thus deterioration of the oxidation catalyst (41A) is compensated for, and an optimum temperature environment for regenerating the filter (41) is realized.

25 Claims, 9 Drawing Sheets

_US 7,159,384 B2_

REGENERATION CONTROL OF DIESEL PARTICULATE FILTER

FIELD OF THE INVENTION

This invention relates to determination of the deterioration of a diesel particulate filter comprising an oxidation catalyst, and regeneration control based on the deterioration determination.

BACKGROUND OF THE INVENTION

JP2003-106140A, published by the Japan Patent Office in 2003, discloses a method of diagnosing the deterioration of a catalyst supported on the surface of a diesel particulate filter (DPF) that traps particulate matter contained in the exhaust gas of a diesel engine.

The DPF is regenerated by burning the trapped particulate matter with high-temperature exhaust gas. When an oxidation catalyst is coated onto a bed which constitutes the filter of the DPF, an oxidation reaction is promoted while the particulate matter deposited on the filter is burned during regeneration, causing the bed temperature of the filter to rise. As a result of this temperature-raising effect, the extent to which the temperature of the exhaust gas must be raised to perform a DPF regeneration operation can be reduced.

However, the oxidation catalyst deteriorates as the filter is regenerated repeatedly. When the oxidation catalyst deteriorates, the bed temperature of the filter cannot be raised sufficiently during regeneration of the DPF, and hence regeneration of the DPF may not be completed.

SUMMARY OF THE INVENTION

In the prior art, an amount of heat generated by a catalytic reaction of combustible substances within the DPF is estimated, and deterioration of the catalyst is determined on the basis of this heat generation amount.

However, it is difficult to estimate only the amount of heat that is generated by the catalytic reaction from among the heat that is generated within the DPF.

It is therefore an object of this invention to determine with accuracy a deterioration in the performance of an oxidation catalyst provided in a DPF.

It is a further object of this invention to execute regeneration control of the DPF efficiently while compensating for the deterioration in the performance of the oxidation catalyst.

In order to achieve the above objects, this invention provides a deterioration diagnosing device for a diesel particulate filter which traps a particulate matter contained in an exhaust gas of a diesel engine. The filter is regenerated by burning a trapped particulate matter under a predetermined temperature condition. The diagnosing device comprises a programmable controller programmed to determine a trapped particulate matter amount at a start of a regeneration of the filter as a first amount, determine a particulate matter combustion amount burned within a predetermined time period from the start of the regeneration of the filter as a second amount, and determine a deterioration in a regeneration performance of the filter on the basis of a difference between the first amount and the second amount.

This invention also provides a deterioration diagnosing method for the diesel particulate filter, comprising determining a trapped particulate matter amount at a start of a regeneration of the filter as a first amount, determining a particulate matter combustion amount burned within a predetermined time period from the start of the regeneration of the filter as a second amount, and determining a deterioration in a regeneration performance of the filter on the basis of a difference between the first amount and the second amount.

This invention also provides a regeneration device for the diesel particulate filter, comprising a mechanism which raises a temperature of the exhaust gas to a target temperature suited for burning the particulate matter, and a programmable controller programmed to determine a trapped particulate matter amount at a start of a regeneration of the filter as a first amount, determine a particulate matter combustion amount burned within a predetermined time period from the start of the regeneration of the filter as a second amount, calculate a deterioration factor representing a degree of deterioration in a regeneration performance of the filter on the basis of a difference between the first amount and the second amount, and update the target temperature according to the deterioration factor.

This invention also provides a regeneration method for the diesel particulate filter, comprising raising a temperature of the exhaust gas to a target temperature suited for burning the particulate matter, determining a trapped particulate matter amount at a start of a regeneration of the filter as a first amount, determining a particulate matter combustion amount burned within a predetermined time period from the start of the regeneration of the filter as a second amount, calculating a deterioration factor representing a degree of deterioration in a regeneration performance of the filter on the basis of a difference between the first amount and the second amount, and updating the target temperature according to the deterioration factor.

The details as well as other features and advantages of this invention are set forth in the remainder of the specification and are shown in the accompanying drawings.

DESCRIPTION OF THE PREFERRED EMBODIMENTS

Figure 1:
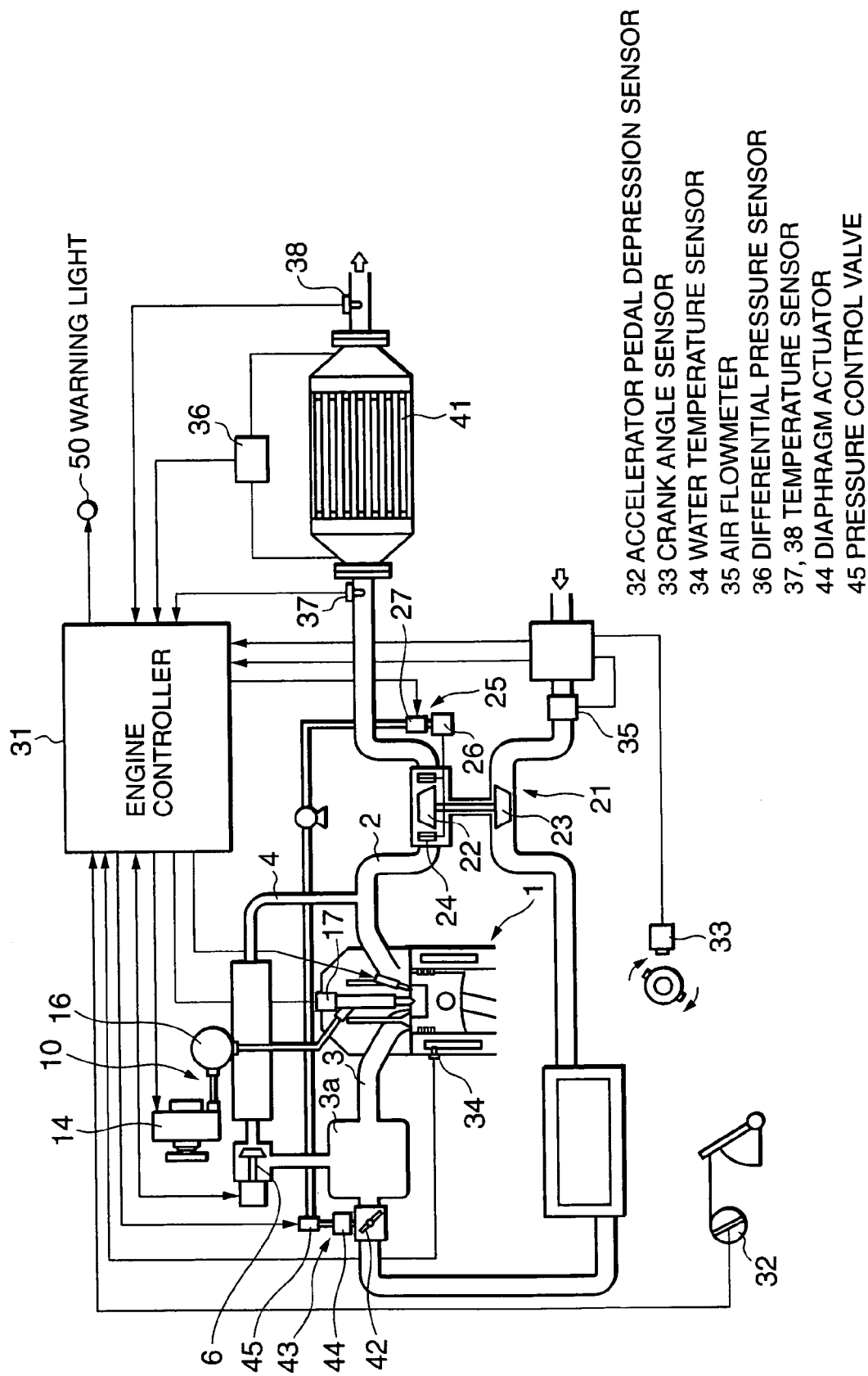
FIG. 1 is a schematic diagram of an exhaust gas purification device to which this invention is applied.

Referring to FIG. 1 of the drawings, a multi-cylinder diesel engine 1 for vehicles is provided with an exhaust passage 2 and intake passage 3. The intake passage 3 is provided with a collector part 3$a$ to distribute intake air to each cylinder. The exhaust passage 2 and the collector part 3$a$ are connected by an exhaust gas recirculation (EGR) passage 4.

A diaphragm type EGR valve 6 is installed in the EGR passage 4. The EGR valve 6 is operated by a pressure limiting valve and diaphragm-type actuator according to a duty signal from an engine controller 31.

The engine 1 is provided with a common rail fuel injection device 10. The fuel injection device 10 is provided with a supply pump 14, common rail (accumulator) 16 and nozzle 17 provided for every cylinder. Fuel pressurized by the supply pump 14 is distributed to each nozzle 17 via the common rail 16.

The nozzle 17 is provided with a needle valve, nozzle chamber, fuel supply passage leading to the nozzle chamber, a retainer, a hydraulic piston and a return spring.

A three-way valve is a valve which selectively connects the common rail 16 and a drain to the fuel supply passage, and in the OFF state, maintains the needle valve in the seated position by the high-pressure fuel pressure of the common rail 16 via the fuel supply passage and the nozzle chamber. In the ON state, by releasing this pressure to the drain, the needle valve is lifted and the fuel in the nozzle chamber is injected into the cylinder. The engine 1 burns the injected fuel in the cylinder by compression ignition.

The fuel injection timing of the nozzle 17 is determined by the change-over timing from OFF to ON of the three-way valve, and the fuel injection amount is determined by the duration of the ON state of the three-way valve. If the pressure of the common rail 16 is identical, the fuel injection amount will increase as the duration of the ON state increases. ON and OFF of the three-way valve are changed over by a signal from the engine controller 31.

This type of common rail fuel injection device 10 is known from U.S. Pat. No. 6,247,311.

A turbine 22 of a variable capacity turbocharger 21 is provided in the exhaust passage 2 downstream of the EGR passage 4. The variable capacity turbocharger 21 is further provided with a compressor 23 installed in the intake passage 3. The turbine 22 transforms the energy of the flow of exhaust gas into rotational energy, and drives the compressor 23 on the same axis using this rotational energy.

A variable nozzle 24 driven by an actuator 25 is installed at the scroll inlet of the turbine 22.

The actuator 25 comprises a diaphragm actuator 26 and a pressure limiting valve 27 which adjusts the control pressure to the diaphragm actuator 26, and it varies the nozzle opening so that a predetermined turbocharging pressure can be obtained in the low rotation speed region of the engine 1. Specifically, at a low rotation speed, the nozzle opening is narrowed so that the flow velocity of exhaust gas introduced into the turbine 22 is increased, and at a high rotation speed, the nozzle opening is widened so that the exhaust gas is introduced into the turbine 22 without resistance.

The pressure limiting valve 27 adjusts the pressure of the diaphragm actuator 26 according to a duty signal from the engine controller 31 so that the opening of the variable nozzle 24 is adjusted to a target nozzle opening.

An intake throttle 42 driven by an actuator 43 is formed in the inlet of the collector part 3$a$.

The actuator 43 comprises a diaphragm actuator 44 which drives the intake throttle 42 according to the control pressure, and a pressure control valve 45 which adjusts the control pressure to the diaphragm actuator 44, according to a duty signal from the engine controller 31 so that the intake throttle 42 has a target opening.

A diesel particulate filter (DPF) 41 which traps particulate matter in the exhaust gas, is installed in the exhaust passage 2 downstream of the turbine 22.

The engine controller 31 comprises a microcomputer provided with a central processing unit (CPU), read-only memory (ROM), random-access memory (RAM) and input/output interface (I/O interface).

The engine controller 31 controls the opening of the EGR valve 6, the fuel injection timing and fuel injection amount of the nozzle 17, the opening of the variable nozzle 24 of the turbocharger 21, and the opening of the intake throttle 42. The particulate matter deposited on the DPF 41 is burned occasionally via these controls, and the DPF 41 is regenerated to the state in which it can again trap particulate matter.

To perform the above control, detection signals from various sensors are inputted into the engine controller 31. These sensors include an accelerator pedal depression sensor 32 which detects a depression amount of an accelerator pedal with which the vehicle is provided, a crank angle sensor 33 which detects a rotation speed Ne and crank angle of the diesel engine 1, a coolant temperature sensor 34 which detects a cooling water temperature of the engine 1, an air flowmeter 35 which detects an intake air amount Qa of the intake passage 2, a differential pressure sensor 36 which detects a differential pressure D P upstream and downstream of the DPF 41, a temperature sensor 37 which detects an exhaust gas temperature T1 at the inlet of the DPF 41, and a temperature sensor 38 which detects an exhaust gas temperature T2 at the outlet of the DPF 41.

When the particulate matter deposition amount of the DPF 41 reaches a predetermined amount, the engine controller 31 starts regenerating the DPF 41, burns the particulate matter deposited on the DPF 41, and thereby removes it from the DPF 41.

Figure 13:
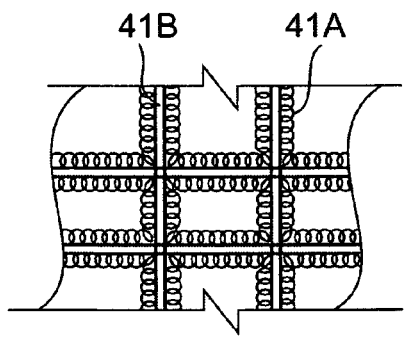
FIG. 13 is a cross-sectional view of the essential parts of a DPF.

Referring to FIG. 13, the DPF 41 comprises a bed 41B serving as a filter main body, and an oxidation catalyst 41A coated onto the bed 41B. The oxidation catalyst 41A promotes an oxidation reaction while the particulate matter deposited on the DPF 41 is burned so that the bed temperature of the DPF 41 is raised, and as a result, combustion of the particulate matter is accelerated.

To regenerate the DPF 41, the exhaust gas temperature must be raised to a target inlet temperature of the DPF 41. However, the target inlet temperature can be lowered in proportion to the degree by which the oxidation catalyst 41A raises the bed temperature, and hence energy expended to raise the exhaust gas temperature can be saved.

However, when regeneration of the DPF 41 is performed repeatedly, the oxidation catalyst 41A begins to deteriorate. When the oxidation catalyst 41A deteriorates, the bed temperature can no longer be raised sufficiently during regeneration of the DPF as noted above, possibly leading to incomplete DPF regeneration.

The engine controller 31 begins regenerating the DPF 41 by raising the exhaust gas temperature when the amount of particulate matter trapped in the DPF 41 reaches a target trapped amount PMα. The trapped particulate matter amount at this time is stored in the memory (RAM) as a first amount PMi.

Meanwhile, a time during which the inlet temperature T1 detected by the temperature sensor 41 has exceeded a predetermined reference temperature is accumulated, and a particulate matter combustion amount PMr in the DPF 41 is calculated at a timing when the accumulated time reaches a predetermined time X A regeneration efficiency ηPM of the DPF 41 is calculated from the particulate matter combustion amount PMr and the first amount PMi stored in the memory, and a determination as to whether or not the DPF 41 is deteriorating is made on the basis of the regeneration efficiency ηPM. The engine controller 31 notifies a driver of the vehicle of the determination result through a warning light 50.

Next, referring to the flowcharts in FIGS. 2, 9, and 12, a routine for regenerating the DPF 41, a routine for calculating a deterioration factor d, and a routine for determining deterioration of the DPF 41, executed by the engine controller 31, will be described.

Figure 2:
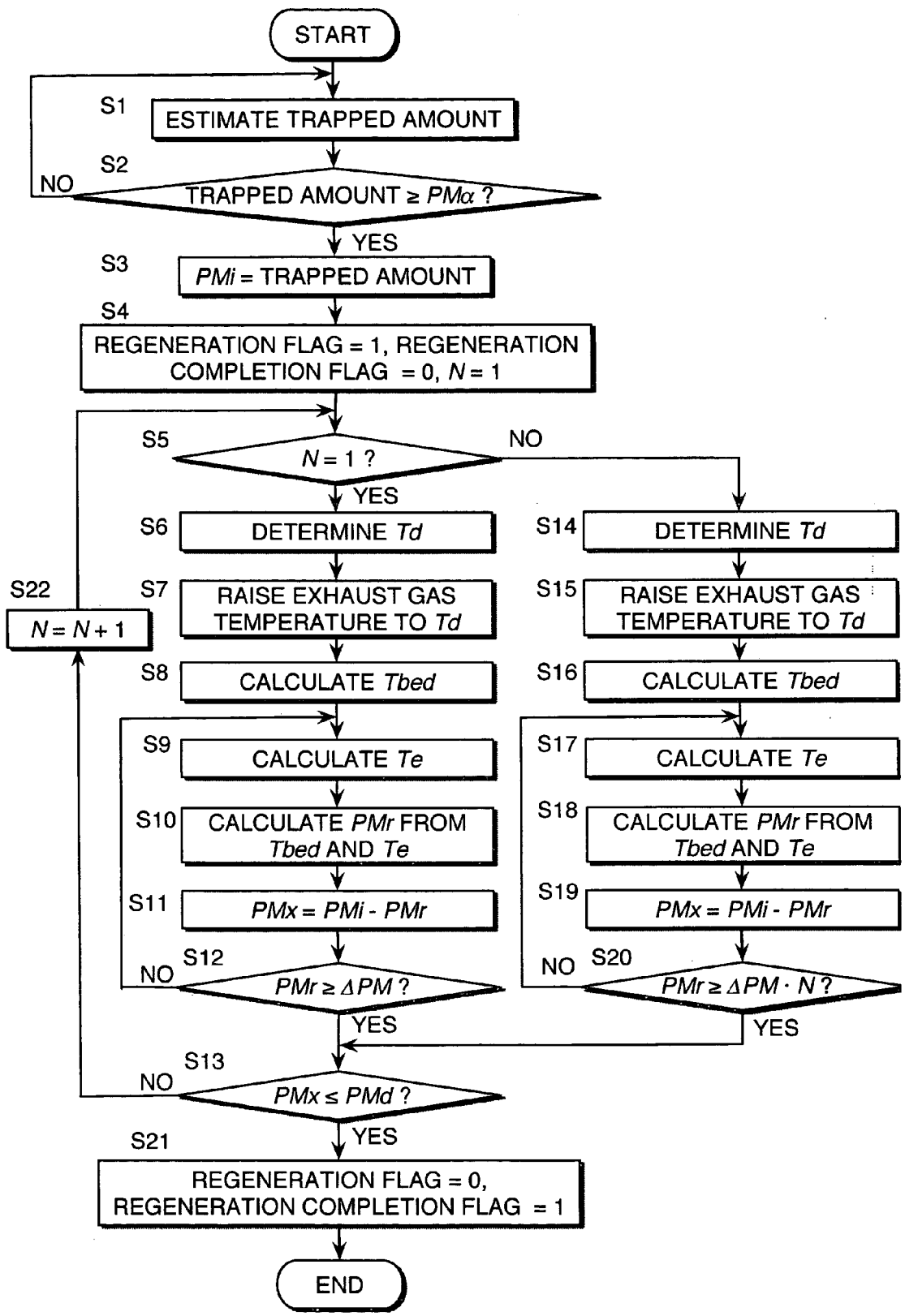
FIG. 2 is a flowchart illustrating a DPF regeneration routine executed by an engine controller according to this invention.

The routine for regenerating the DPF 41 shown in FIG. 2 begins with the start of an operation of the diesel engine 1. As the routine ends, the next execution begins, and hence the routine is executed substantially constantly while the diesel engine 1 is operative.

First, in a step S1, the engine controller 31 estimates the trapped particulate matter amount in the DPF 41 on the basis of the differential pressure detected by the differential pressure sensor 36.

Next, in a step S2, the engine controller 31 determines whether or not the trapped particulate matter amount has reached a reference trapped amount PMα for regenerating the DPF 41. The reference trapped amount PMα for regenerating the DPF 41 is determined in advance through experiment.

If the trapped particulate matter amount PMi has not reached the reference trapped amount PMα for regenerating the DPF 41, the engine controller 31 repeats the processing from the step S1.

When the trapped particulate matter amount reaches the reference trapped amount PMα for regenerating the DPF 41, the engine controller 31 stores the trapped particulate matter amount in the memory (RAM) as the first amount PMi in a step S3.

Next, in a step S4, the engine controller 31 sets a regeneration flag to unity, resets a regeneration completion flag to zero, and sets a counter value N to one.

In a step S5, the engine controller 31 determines whether the counter value N is one or not. When the determination in the step S5 is performed immediately after the processing in the step S4, the counter value N is one, and hence in the step S5, the determination is positive. However, once the counter value has been incremented in a step S22 to be described below, the counter value N becomes larger than one, and hence the determination in the step S5 becomes negative. Thus the determination in the step S5 becomes positive only when the trapped particulate matter amount in the DPF 41 first reaches the reference trapped amount PMα for regeneration during an execution of the routine.

When the determination in the step S5 is positive, the engine controller 31 performs the processing of steps S6–S12. When the determination in the step S5 is negative, the engine controller 31 performs the processing of steps S14–S20.

Figure 3:
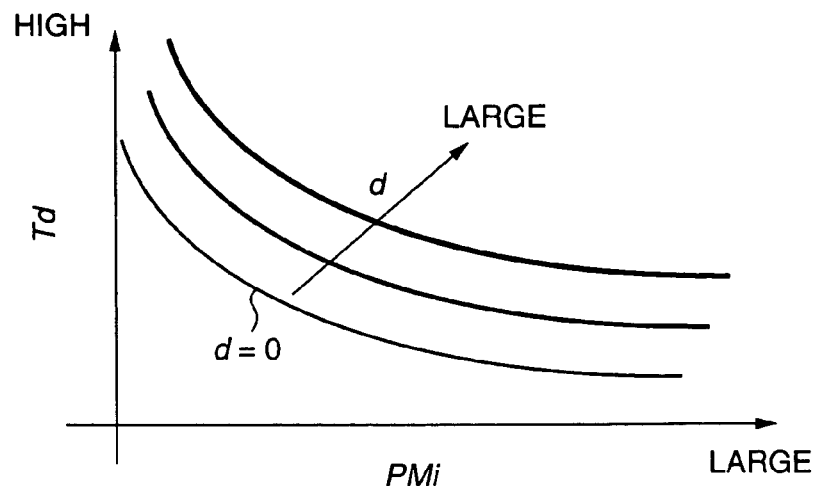
FIG. 3 is a diagram showing the characteristics of a map of a target inlet temperature Tin, which is stored by the engine controller.

In the step S6, the engine controller 31 refers to a map having the characteristics shown in FIG. 3 and stored in the memory (ROM) in advance to determine a target inlet temperature Tin of the DPF 41 from the first amount PMi stored in the memory (RAM) and the deterioration factor d of the oxidation catalyst 41A. As shown in the diagram, the target inlet temperature Tin decreases as the first amount PMi increases. When the first amount PMi increases, a large amount of particulate matter burns during regeneration. The reason for setting the target inlet temperature Tin to decrease as the first amount PMi increases is to prevent the temperature of the DPF 41 from rising excessively due to an increase in temperature caused by combustion of the particulate matter. By determining the target inlet temperature Tin with the first amount PMi, or in other words the trapped particulate matter amount at the start of regeneration, as a parameter, differences in the specifications of the diesel engine 1 and DPF 41 can be prevented from influencing the target inlet temperature Tin.

The deterioration factor d is calculated in the routine in FIG. 9, to be described below. Here, the newest value calculated in the immediately preceding execution of the routine in FIG. 9 is used. When the deterioration factor d is zero, this indicates that the oxidation catalyst 41A has not deteriorated, and an increasing value shows the extent to which deterioration has progressed.

Referring to FIG. 3, when the first amount PMi is constant, the target inlet temperature Tin rises as the deterioration factor d increases. When the oxidation catalyst 41A coated onto the bed 41B of the DPF 41 deteriorates, it becomes impossible to promote an oxidation reaction as the trapped particulate matter burns, and as a result, it becomes difficult to raise the bed temperature of the DPF 41. By raising the target inlet temperature Tin as deterioration of the oxidation catalyst 41A progresses, an increase in the bed temperature can be secured.

When the deterioration factor d is zero, the target inlet temperature Tin is set even lower than a case of the DPF on which the oxidation catalyst is not provided. The reason for this is that as long as the oxidation catalyst 41A does not deteriorate, the desirable effect of raising the bed temperature through the promotion of an oxidation reaction can be achieved.

Next, in a step S7, the engine controller 31 raises the exhaust gas temperature to realize the target inlet temperature Tin. The exhaust gas temperature is raised by well-known control of the fuel injection device 10 such as post-injection, in which fuel is injected again following normal fuel injection, and/or retardation of the fuel injection timing. The fuel injection device 10 corresponds to the claimed temperature raising mechanism.

Next, in a step S8, the engine controller 31 estimates a bed temperature Tbed of the DPF 41 on the basis of the inlet temperature T1 of the DPF 41, detected by the temperature sensor 37, and the outlet temperature T2 of the DPF 41, detected by the temperature sensor 38. In short, the average value of the inlet temperature T1 and outlet temperature T2 may be taken as the bed temperature Tbed.

Next, in a step S9, the engine controller 31 calculates an effective regeneration time Te. The effective regeneration time Te is an integrated value of the time during which the bed temperature Tbed of the DPF 41 exceeds a target bed temperature Tx. The target bed temperature Tx is set to a temperature at which regeneration of the DPF 41 is performed reliably, or in other words a temperature at which the particulate matter is burned reliably. The target bed temperature Tx is dependent on the target inlet temperature Tin, and also on the first amount PMi, or in other words the trapped particulate matter amount at the start of regeneration processing.

Figure 4:
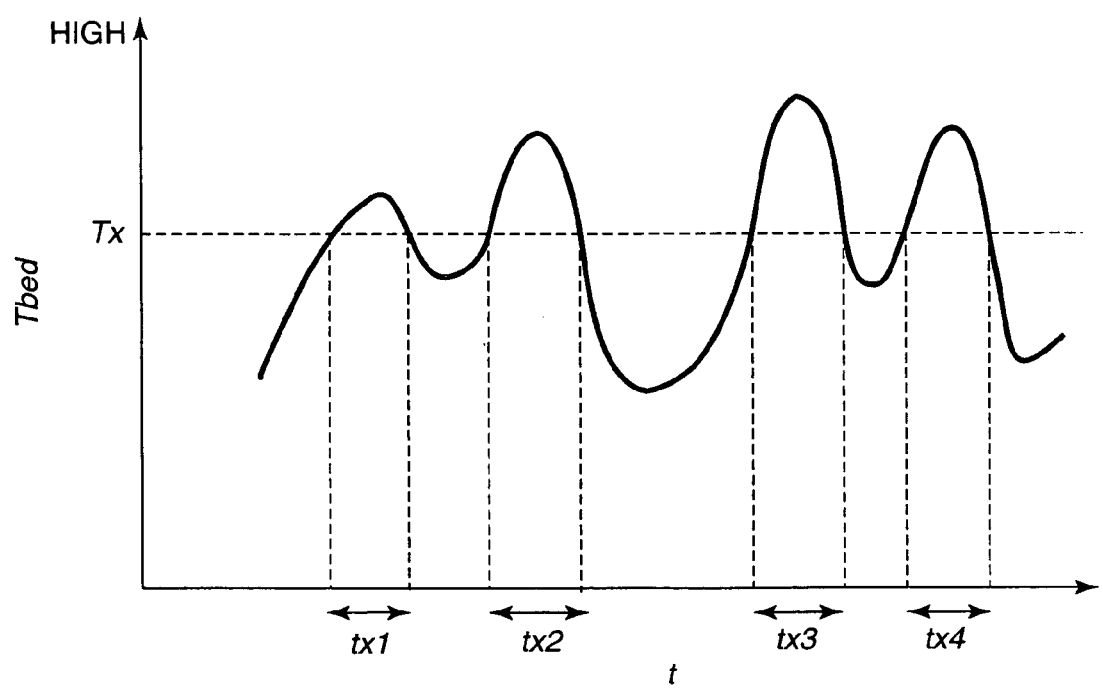
FIG. 4 is a timing chart illustrating an effective regeneration time according to this invention.

Referring to FIG. 4, the bed temperature Tbed varies according to variation in the running condition. When the bed temperature Tbed is lower than the target bed temperature Tx, the particulate matter trapped by the DPF 41 may not burn completely, leaving a part of the particulate matter unburned. The effective regeneration time Te indicates the period during which complete combustion of the particulate matter actually takes place. Specifically, the effective regeneration time Te is calculated using the following equation (1).

$$Te = Tx1 + Tx2 + Tx3 + Tx4 + \ldots \quad (1)$$

Using the effective regeneration time Te, the particulate matter combustion amount in the DPF 41, excluding periods of incomplete particulate matter combustion during the regeneration period, can be estimated with a high degree of precision.

It should be noted that the method of calculating the effective regeneration time Te is not limited to Equation (1).

A second embodiment of this invention, relating to calculation of the effective regeneration time Te, will now be described.

As described above, when the bed temperature Tbed is lower than the target bed temperature Tx, unburned particulate matter remains. However, a part of the particulate matter does not remain, or in other words is burned away. The method of calculating the effective regeneration time Te according to this embodiment takes into account the particulate matter that is burned away when the bed temperature Tbed is lower than the target bed temperature Tx.

Figure 5:
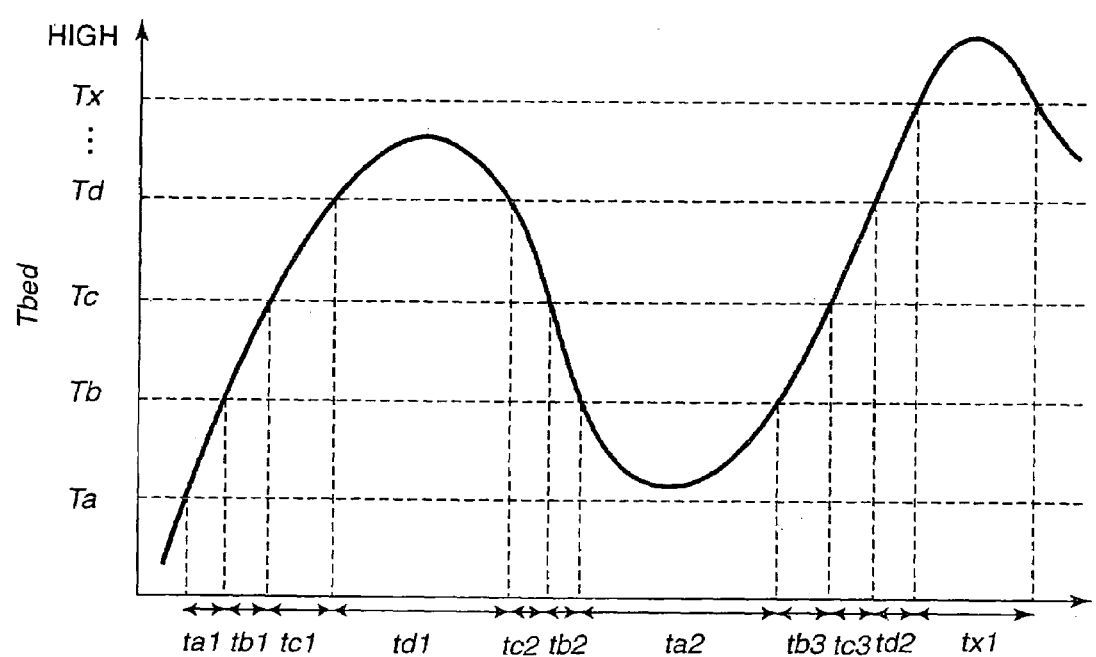
FIG. 5 is a timing chart illustrating a second embodiment of this invention, relating to the effective regeneration time.

Referring to FIG. 5, a minimum temperature for burning a part of the particulate matter in a lower temperature region than the target bed temperature Tx is set as a first temperature Ta. The temperature region from the first temperature Ta to the target bed temperature Tx is divided into a plurality of regions. Here, four regions are set with a second temperature Tb, a third temperature Tc, and a fourth temperature Td serving as regional boundaries.

The periods during which the bed temperature Tbed is in the temperature region between the first temperature Ta and second temperature Tb are denoted as ta1, ta2. The periods during which the bed temperature Tbed is in the temperature region between the second temperature Tb and third temperature Tc are denoted as tb1, tb2, tb3. The periods during which the bed temperature Tbed is in the temperature region between the third temperature Tc and the target bed temperature Tx are denoted as td1, td2. The period during which the bed temperature Tbed is equal to or greater than the target bed temperature Tx is denoted as tx1.

Figure 6:
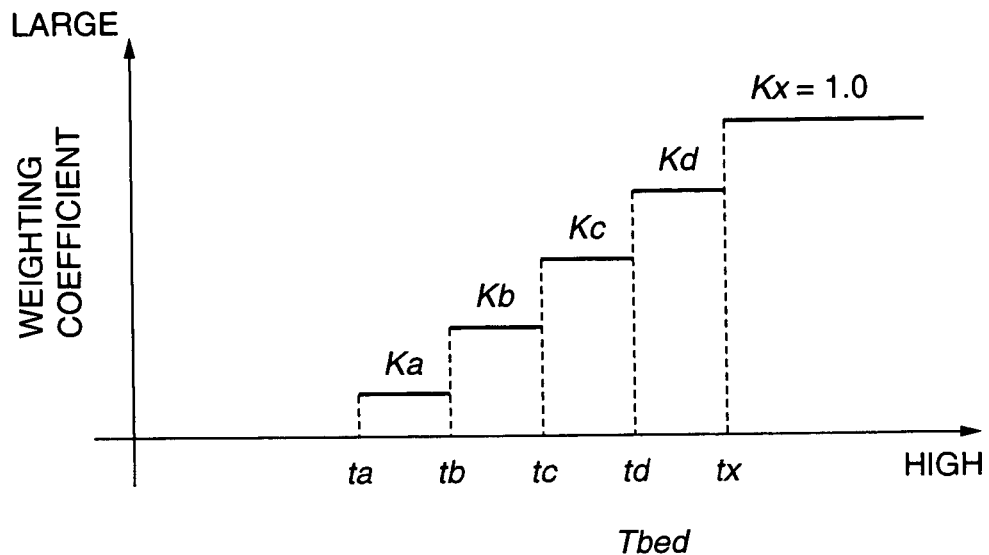
FIG. 6 is a diagram showing the characteristics of a map of a temperature coefficient relating to the effective regeneration time, which is stored by the engine controller.

Thus variation in the bed temperature Tbed is grasped according to the temperature region and the duration of stay within that region, and a value obtained by multiplying a weighting coefficient Ka-Kd shown in FIG. 6, which corresponds to the temperature region, by the duration of stay is adopted as the effective regeneration time Te. In other words, the effective regeneration time Te is integrated using the following equation (2).

$$Te = Ka \cdot ta + Kb \cdot tb + Kc \cdot tc + Kd \cdot td + \ldots + tx \quad (2)$$

where $ta = \Sigma\, tan$,
$tb = \Sigma\, tbn$,
$tc = \Sigma\, tcn$,
$td = \Sigma\, tdn$,
$tx = \Sigma\, txn$ Ka=temperature coefficient K for temperature region from temperature ta to tb,
Kb=temperature coefficient K for temperature region from temperature tb to tc,
Kc=temperature coefficient K for temperature region from temperature tc to td,
Kd=temperature coefficient K for temperature region from temperature td to tx, and
n=an integer starting from 1.

The temperature coefficient Kx when the bed temperature Tbed is equal to or greater than the target bed temperature Tx is 1.0. When the bed temperature Tbed is lower than the target bed temperature Tx, for example when ten percent of the particulate matter in the DPF 41 remains unburned and ninety percent is burned away, the temperature coefficient K is 0.9. Similarly, when fifty percent of the particulate matter in the DPF 41 remains unburned and fifty percent is burned away, the temperature coefficient K is 0.5. When the bed temperature Tbed is lower than the target bed temperature Tx, the proportion of particulate matter that is burned away decreases as the bed temperature Tbed falls. Accordingly, the five temperature coefficients Ka, Kb, Kc, Kd, Kx have a relationship of Ka<Kb<Kc<Kd<Kx, as shown in FIG. 6.

To perform the calculation shown in Equation (2), a map of the weighting coefficient K having the characteristics shown in FIG. 6 is stored in the ROM of the engine controller 31 in advance. The specific numerical values of the temperature coefficient K are set in advance through experiment.

According to this embodiment, the effective regeneration period Te is calculated in consideration of the amount of particulate matter that is burned away in the temperature regions where the bed temperature Tbed is lower than the target bed temperature Tx, and hence the combustion amount of the particulate matter trapped in the DPF 41 can be estimated with a high degree of precision.

The sum total of the values of the right hand side of the equation (2) except the last term tx constitutes the claimed supplementary time.

Figure 7:
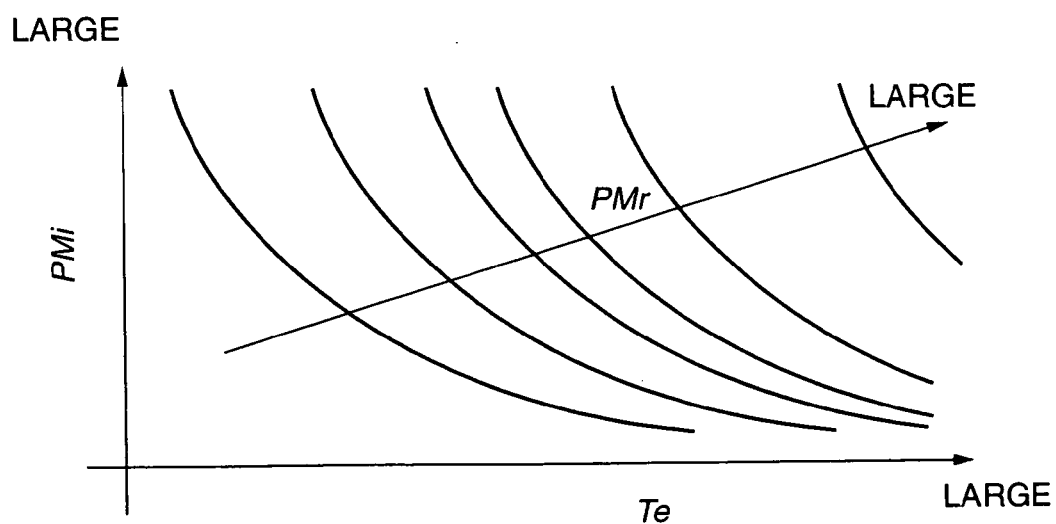
FIG. 7 is a diagram showing the characteristics of a map of a particulate matter combustion amount, which is stored by the engine controller.

Referring back to FIG. 2, in a step S10 the engine controller 31 refers to a map having the characteristics shown in FIG. 7 and stored in advance in the memory (ROM) to calculate, from the effective regeneration time Te and the first amount PMi stored in the memory (RAM), a particulate matter combustion amount PMr that is burned away from the first amount PMi, which is the amount of particulate matter trapped in the DPF 41.

Referring to FIG. 7, when the first amount PMi is constant, the particulate matter combustion amount PMr increases as the effective regeneration time Te lengthens. When the effective regeneration time Te is equal, the particulate matter combustion amount PMr increases as the first amount PMi increases.

Next, in a step S11, the engine controller 31 uses the following equation (3) to calculate a residual particulate matter amount PMx, i.e. the amount of particulate matter remaining in the DPF 41, from the first amount PMi and the particulate matter combustion amount PMr.

$$PMx = PMi - PMr \quad (3)$$

Next, in a step S12, the engine controller 31 compares the particulate matter combustion amount PMr to a predetermined target particulate matter combustion amount ΔPM. In this routine, the target inlet temperature Tin of the DPF 41 is raised as regeneration progresses, as will be described in detail below. Hence whenever the particulate matter combustion amount PMr reaches the target particulate matter combustion amount ΔPM, the target inlet temperature Tin is recalculated. In other words, the target particulate matter combustion amount ΔPM serves as a reference value for determining whether or not to recalculate the target inlet temperature Tin.

Figure 8:
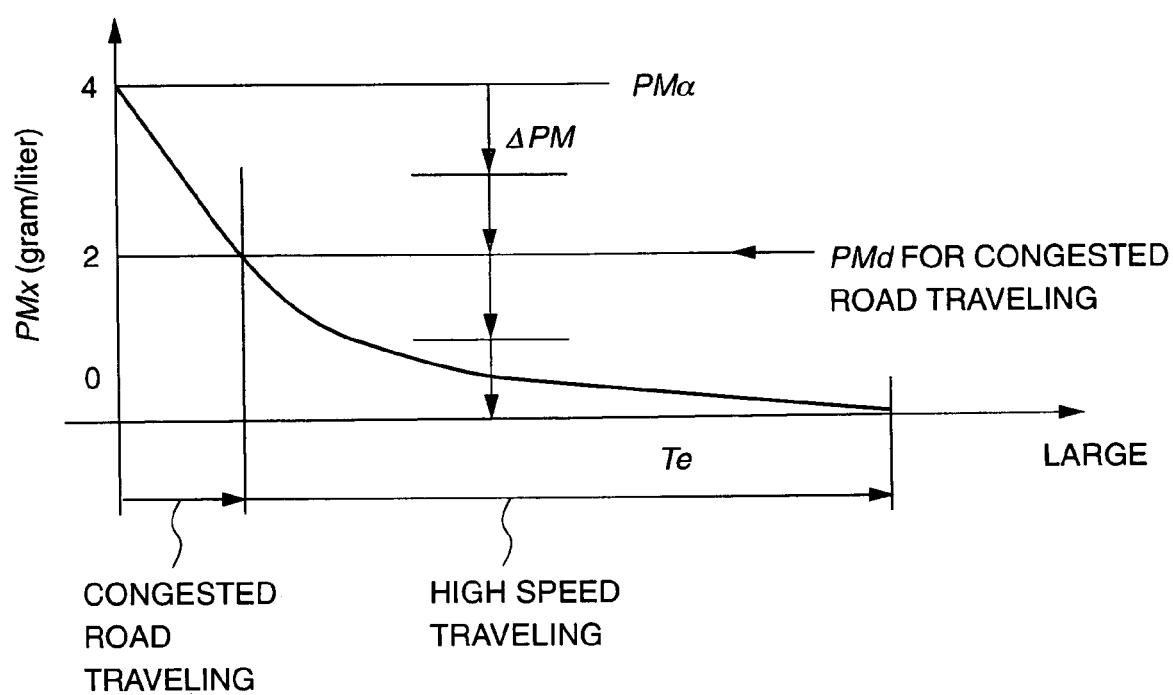
FIG. 8 is a diagram illustrating a relationship between the effective regeneration time and a residual particulate matter amount.

Referring to FIG. 8, in this embodiment the reference trapped amount PMα is set at four grams per liter, and the target particulate matter combustion amount ΔPM is set at a quarter thereof, i.e. one gram per liter. The target combustion amount ΔPM is set in accordance with the specifications of the diesel engine 1 and the DPF 41, and therefore is not limited to a quarter of the reference trapped amount PMα. It should be noted that the unit of the reference trapped amount PMα is a value obtained by dividing the mass (in grams) of the particulate matter trapped in the DPF 41 by the volume (in liters) of the DPF 41.

When, in the step S12, the particulate matter combustion amount PMr has not reached the target combustion amount ΔPM, the engine controller 31 repeats the processing of the steps S9–S12. As a result of this repetition, the particulate matter combustion amount PMr increases and the remaining particulate matter amount PMx decreases.

When the particulate matter combustion amount PMr reaches the target combustion amount ΔPM in the step S12, the engine controller 31 determines in a step S13 whether or not the residual particulate matter amount PMx has fallen to a target residual particulate matter amount PMd. The target residual particulate matter amount PMd corresponds to an allowable residual particulate matter amount at the end of regeneration of the DPF 41. This value is set in advance through experiment in accordance with the running condition of the vehicle. When the running condition corresponds to a high speed running condition that is suitable for complete regeneration of the DPF 41, the target residual particulate matter amount PMd is zero grams per liter. On the other hand, when the running condition corresponds to a congestion running condition which is not suitable for complete regeneration of the DPF 41, in this embodiment the target residual particulate matter amount PMd is set to two grams per liter, which is half the reference trapped amount PMα of four grams per liter, as shown in FIG. 8. In other words, in the congestion running condition it is assumed that half the amount of particulate matter burned in the high speed running condition will be burned. When this condition is satisfied, the engine controller 31 temporarily halts regeneration of the DPF 41.

When the determination in the step S13 is positive, the engine controller 31 resets the regeneration flag to zero and sets the regeneration completion flag to unity in a step S21, and then ends the routine. The regeneration flag and regeneration completion flag are maintained in this state until the determination in the step S2 becomes positive during the next execution of the routine. These flags are referenced when executing the deterioration factor calculation routine shown in FIG. 9, to be described below.

When the determination in the step S13 is negative, on the other hand, the engine controller 31 increments the counter value N in a step S22, and then returns to the step S5. When the counter value N has been incremented, the counter value becomes a value of two or more.

Hence in this case, the determination in the step S5 is negative. When the determination in the step S5 is negative, the engine controller 31 performs the processing of the steps S14–S20.

In the step S14, the engine controller 31 refers to the map having the characteristics shown in FIG. 3, which was also referred to in the step S6, to determine the target inlet temperature Tin on the basis of the residual particulate matter amount PMx. It should be noted that here, the residual particulate matter amount PMx is applied instead of the first amount PMi as the value on the abscissa in FIG. 3. The amount of particulate matter trapped in the DPF 41 is lower upon execution of the step S14 than when the step S6 was executed. Hence the target inlet temperature Tin obtained in the step S14 is higher than the target inlet temperature Tin obtained in the step S6. The target inlet temperature Tin is preferably set to a higher value every time the particulate matter combustion amount PMr reaches the target combustion amount ΔPM in order to promote combustion of the particulate matter.

The processing of steps S15–S18 is identical to the processing of the steps S7–S10.

In a step S19, the engine controller 31 calculates the residual particulate matter amount PMx using the following equation (4).

$$PMx = PMi - PMr \qquad (4)$$

The particulate matter combustion amount PMr is the total amount of particulate matter burned from the start of regeneration to the present time, rather than the amount of particulate matter that is burned during the processing loop of the steps S17–S20. The effective regeneration time Te determined in the step S17 is also an integrated value from the start of regeneration to the present time.

In a step S20, the engine controller 31 determines whether or not the relationship of the following equation (5) has been established in relation to the particulate matter combustion amount PMr.

$$PMr \geq \Delta PM \cdot N \qquad (5)$$

The counter value N expresses the total number of executions of the loop of the steps S9–S12 and the loop of the steps S17–S20. The counter value N is incremented every time the particulate matter combustion amount PMr reaches the target combustion amount ΔPM. The determination in the step S20 as to whether or not the loop of the steps S17–S20 should be halted is made according to whether or not the particulate matter combustion amount PMr has reached ΔPM·N.

Here, during an execution of the loop of the steps S17–S20 following an execution of the loop of the steps S9–S12, the counter value N is two. As shown in FIG. 8, when the first amount PMi, or in other words the amount of trapped particulate matter at the start of DPF regeneration, is set at four grams per liter and the target combustion amount ΔPM is set at one gram per liter, the right side of Equation (5) becomes 4−1×2=2 (grams/liter). In other words, in this state the determination performed by the engine controller 31 in the step S20 becomes a determination as to whether or not the particulate matter combustion amount PMr has reached two grams per liter.

When the determination in the step S20 is negative, the processing of the steps S17–S20 is continued. When the determination in the step S20 is positive, the engine controller 31 performs the determination of the step S13. If, as a result, the residual particulate matter amount PMx has not fallen to the target residual particulate matter amount PMd, the counter value N is incremented in the step S22, and regeneration of the DPF 41 is continued. If the residual particulate matter amount PMx has fallen to the target residual particulate matter amount PMd, the engine controller 31 resets the regeneration flag to zero and sets the regeneration completion flag to unity in the step S21, and then ends the routine. It should be noted that after ending the routine, the engine controller 31 begins to execute the next routine immediately.

Next, referring to FIG. 9, the routine for calculating the deterioration factor d of the oxidation catalyst 41A will be described. This routine is executed independently of the regeneration routine in FIG. 2, but similarly to the regeneration routine, begins with the start of an operation of the diesel engine 1. Also similarly to the regeneration routine, the next execution begins as the routine ends, and hence the routine is executed substantially constantly while the diesel engine 1 is operative.

In a step S31, the engine controller 31 determines whether or not the regeneration flag is at unity, and in a step S32, determines whether or not the operation of the step S7 to raise the exhaust gas temperature is complete. These determinations are made to determine whether or not regeneration of the DPF 41 is substantially underway. When both of the determinations in the steps S31 and S32 are positive, the engine controller 31 performs processing from a step S33 onward. If either of the determinations in the steps S31 and S32 is negative, the engine controller 31 repeats these determinations.

In the step S33, the engine controller 31 stores the target inlet temperature Tin calculated at the start of the regeneration of the DPF 41, as a reference temperature. Herein, it is regarded that the particulate matter trapped in the DPF 41 is in a combustible state when the inlet temperature of the DPF 41 is equal to or higher than the reference temperature.

Next, in a step S34, the engine controller 31 calculates a maintenance time ti.

Figure 10:
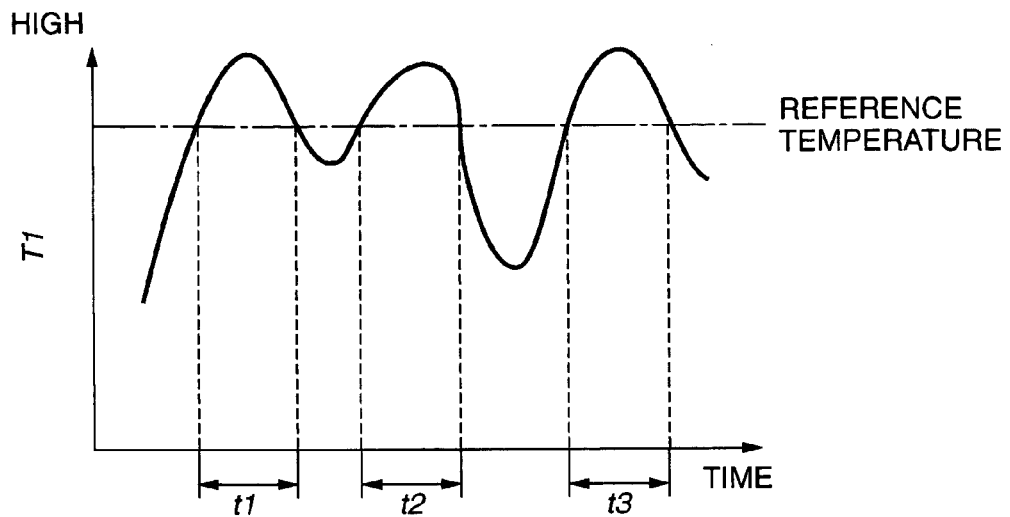
FIG. 10 is a timing chart showing variation in a DPF inlet temperature in order to illustrate a target bed temperature maintenance time according to this invention.

Referring to FIG. 10, the maintenance time ti corresponds to an integrated value from the start of regeneration of the times during which the inlet temperature T1 of the DPF 41, detected by the temperature sensor 37, equals or exceeds the reference temperature, as shown in the diagram. In the diagram, ti=t1+t2+t3 . . . .

Next, in a step S35, the engine controller 31 determines whether or not the maintenance time ti has reached a predetermined time X. The predetermined time X is set according to the required regeneration time. Here, the predetermined time X is set at ten minutes. The engine controller 31 repeats the processing of the steps S33–S35 until the maintenance time ti reaches the predetermined time X.

The reason for calculating the maintenance time ti is as follows. Specifically, the inlet temperature of the DPF 41 does not always satisfy the target inlet temperature Tin, even when the operation to raise the exhaust gas temperature is performed. When, for example, the vehicle runs downhill and the driver releases the accelerator pedal, the exhaust gas temperature lowers and the inlet temperature of the DPF 41 may become lower than the target inlet temperature Tin. By eliminating such a time period from the calculation of the maintenance time ti and accumulating only a time period during which the particulate matter really burns, the precision of the calculation of a second amount that will be performed in a next step S35 is increased.

When the maintenance time ti reaches the predetermined time X in the step S35, the engine controller 31 reads the particulate matter combustion amount PMr up to the present time as the second amount in a step S36. This corresponds to the newest value calculated in the step S10 or the step S18.

Next, in a step S37, the engine controller 31 reads the first amount PMi from the memory (RAM).

Next, in a step S38, the engine controller 31 calculates the regeneration efficiency ηPM using the following equation (6).

$$\eta PM = \frac{PMr}{PM\alpha} \cdot 100 \tag{6}$$

The regeneration efficiency ηPM indicates the extent to which the particulate matter in the DPF 41 has burned when the maintenance time ti reaches the predetermined time X. If the oxidation catalyst 41A has not deteriorated at all, the value thereof should be one hundred percent. If the oxidation catalyst 41A is deteriorating, the value of the regeneration efficiency ηPM decreases in accordance with the extent of the deterioration.

Next, in a step S39, the engine controller 31 determines whether or not the regeneration completion flag is at unity, or in other words whether or not regeneration of the DPF 41 is complete. If the determination in the step S39 is negative, the engine controller 31 repeats the determination of the step S39 until the regeneration completion flag switches to unity.

When the regeneration completion flag switches to unity, the engine controller 31 updates a regeneration efficiency integrated value SUMη in a step S40 using the following equation (7).

$$SUM\eta = SUM\eta_{(n-1)} + \eta PM \tag{7}$$

where $SUM\eta_{(n-1)}$=the regeneration efficiency integrated value SUMη prior to the update.

The initial value of SUMη, is set at zero.

Next, in a step S41, the engine controller 31 increments the number of integrations. Then, in a step S42, the engine controller 31 determines whether or not the number of integrations has reached a predetermined number Y.

When the determination in the step S42 is negative, the engine controller 31 repeats the process of the steps S31–S42. When the determination in the step S42 becomes positive, the engine controller 31 calculates an average regeneration efficiency ηPMd in a step S43 using the following equation (8).

$$\eta PMd = \frac{SUM\eta}{Y} \tag{8}$$

Next, in a step S44, the engine controller 31 resets the number of integrations and the regeneration efficiency integrated value SUMη respectively to zero in order to calculate the next deterioration factor d.

Next, in a step S45, the engine controller 31 calculates a variation ΔηPM between the previous value and current value of the average regeneration efficiency ηPMd using the following equation (9).

$$\Delta\eta PM = \eta PMd_{(n-1)} - \eta PMd \tag{9}$$

where $\eta PMd_{(n-1)}$=previous value of ηPMd.

As the oxidation catalyst 41A deteriorates gradually, the average regeneration efficiency ηPM decreases gradually. Accordingly, the variation ΔηPM becomes a positive value.

Figure 11:
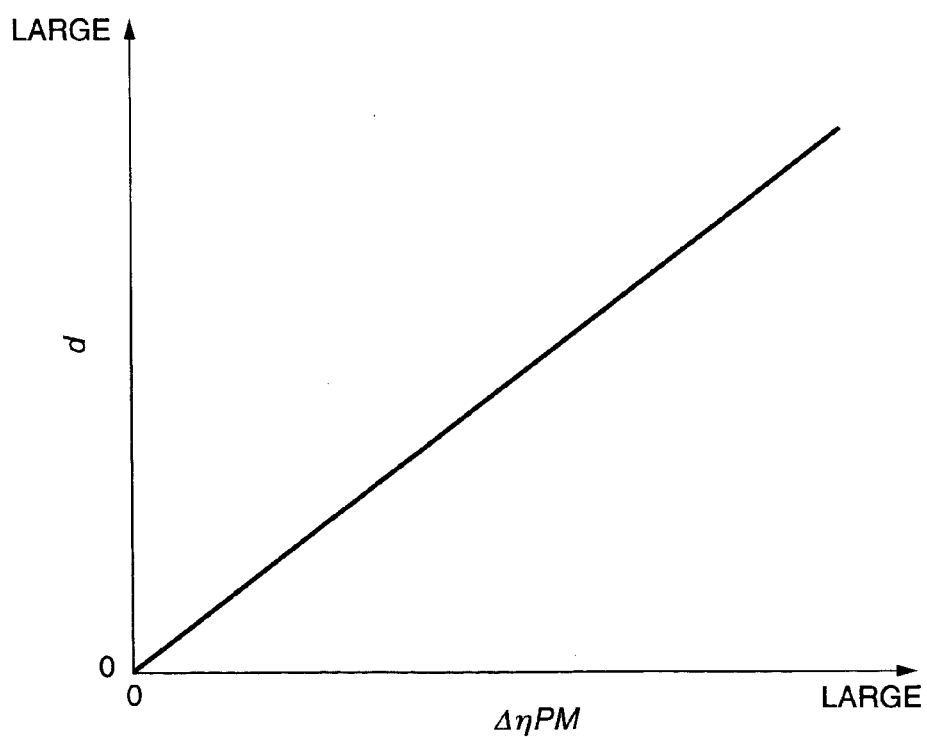
FIG. 11 is a diagram showing the characteristics of a map of an oxidation catalyst deterioration factor d, which is stored by the engine controller.

Next, in a step S46, the engine controller 31 refers to a map having the characteristics shown in FIG. 11 and stored in the memory (ROM) in advance to determine the deterioration factor d on the basis of the variation ΔηPM in the average regeneration efficiency ηPMd. Referring to FIG. 11, as the variation ΔηPM increases, the deterioration factor d also increases.

After calculating the deterioration factor d in the step S46, the engine controller 31 ends the routine. It should be noted that when the routine ends, the next execution of the routine begins immediately, as noted above, and hence processing is executed again from the step S31.

The deterioration factor d obtained in this manner is next used in the calculation of the target inlet temperature Tin in the step S6 or S14 of FIG. 2.

Next, referring to FIG. 12, a routine for determining deterioration of the DPF 41 will be described. This routine is performed to determine deterioration of the catalyst in the DPF 41 using the deterioration factor d calculated in FIG. 9. The engine controller 31 executes this routine upon completion of the deterioration factor calculation routine of FIG. 9. It should be noted, however, that in cases where the deterioration factor calculation routine of FIG. 9 is executed a plurality of times while the vehicle is operative, the deterioration determination routine of FIG. 12 may be limited to a single execution.

Figure 9:
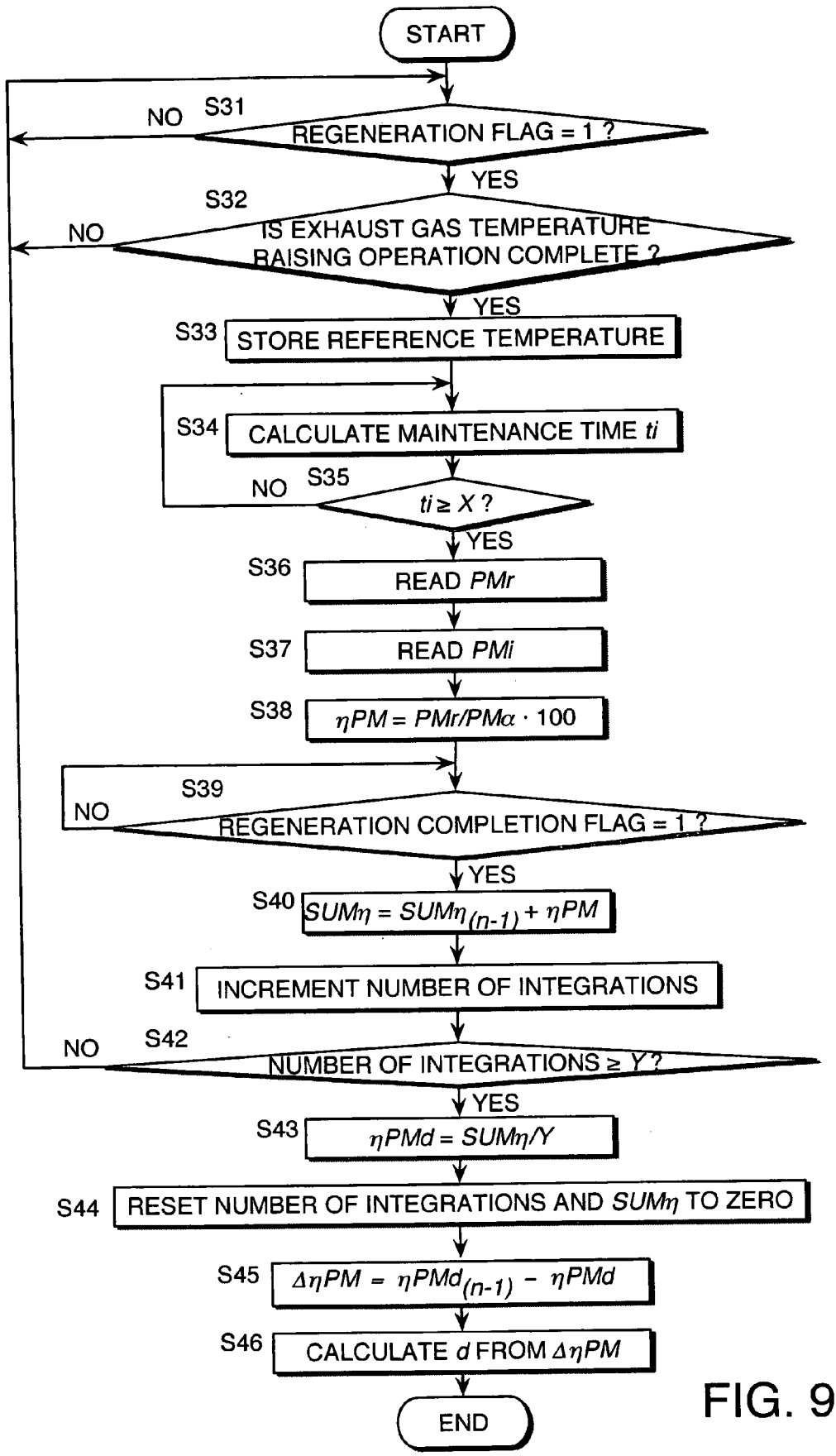
FIG. 9 is a flowchart illustrating a deterioration factor calculation routine executed by the engine controller.

First, in a step S51, the engine controller 31 reads the newest regeneration efficiency ηPM calculated in the step S38 of the deterioration factor calculation routine of FIG. 9.

Next, in a step S52, the engine controller 31 determines whether or not the regeneration efficiency ηPM has reached a predetermined efficiency.

When the regeneration efficiency ηPM has not reached the predetermined efficiency, the engine controller 31 determines in a step S53 that the oxidation catalyst 41A of the DPF 41 has deteriorated and notifies the driver of the vehicle that the oxidation catalyst 41A has deteriorated by turning on the warning light 50. If the regeneration efficiency ηPM has reached the predetermined efficiency, the engine controller 31 determines in a step S54 that the oxidation catalyst 41A of the DPF 41 has not deteriorated and maintains the warning light in the turned-off state.

Deterioration of the oxidation catalyst 41A is determined in the step S52 from the regeneration efficiency ηPM, but the parameter for this determination is not limited to the regeneration efficiency ηPM, and any parameter which indicates deterioration of the oxidation catalyst 41A may be used. More specifically, deterioration of the oxidation catalyst 41A may be determined on the basis of the average regeneration efficiency ηPMd or the deterioration factor d.

According to this invention as described above, in the DPF 41 comprising the oxidation catalyst 41A, the deterioration factor d is calculated on the basis of the regeneration efficiency ηPM of the DPF 41, and the target inlet temperature Tin for regenerating the DPF 41 is determined from the deterioration factor d by referring to the map having the characteristics shown in FIG. 3. Further, deterioration of the oxidation catalyst 41A is determined on the basis of the regeneration efficiency ηPM. By determining deterioration of the oxidation catalyst 41A on the basis of the actual regeneration efficiency ηPM of the DPF 41 in this manner, deterioration of the oxidation catalyst 41A can be determined more accurately than in the prior art, where the amount of heat generated by a catalytic reaction of combustible substances inside the DPF is estimated. Moreover, since the determination is made according to the actual regeneration efficiency ηPM of the DPF 41, the regeneration efficiency of the entire DPF 41 can be determined as well as deterioration of the oxidation catalyst 41A.

Also in this invention, the deterioration factor d of the oxidation catalyst 41A, determined from the regeneration efficiency ηPM, is taken into account when determining the target inlet temperature Tin, thereby compensating for a weakening of the effect of raising the bed temperature of the DPF 41 caused by deterioration of the oxidation catalyst 41A, and hence the DPF 41 can be regenerated in an optimum temperature environment at all times. Accordingly, the required regeneration time of the DPF 41 can be shortened.

The contents of Tokugan 2003-416056 and Tokugan 2003-416042, both of which have a filing date of Dec. 15, 2003 in Japan, are hereby incorporated by reference.

Although the invention has been described above by reference to certain embodiments of the invention, the invention is not limited to the embodiments described above. Modifications and variations of the embodiments described above will occur to those skilled in the art, within the scope of the claims.

For example, in the above embodiments, the first amount PMi of the DPF 41, or in other words the amount of trapped particulate matter at the start of DPF regeneration, is estimated on the basis of the differential pressure detected by the differential pressure sensor 36, but the trapped particulate matter amount PMi may be determined by another method.

Various devices, such as a device which supplies secondary air to the exhaust gas, may be applied as the exhaust gas oxygen concentration regulating mechanism instead of the variable nozzle 24 and intake throttle 42.

Figure 12:
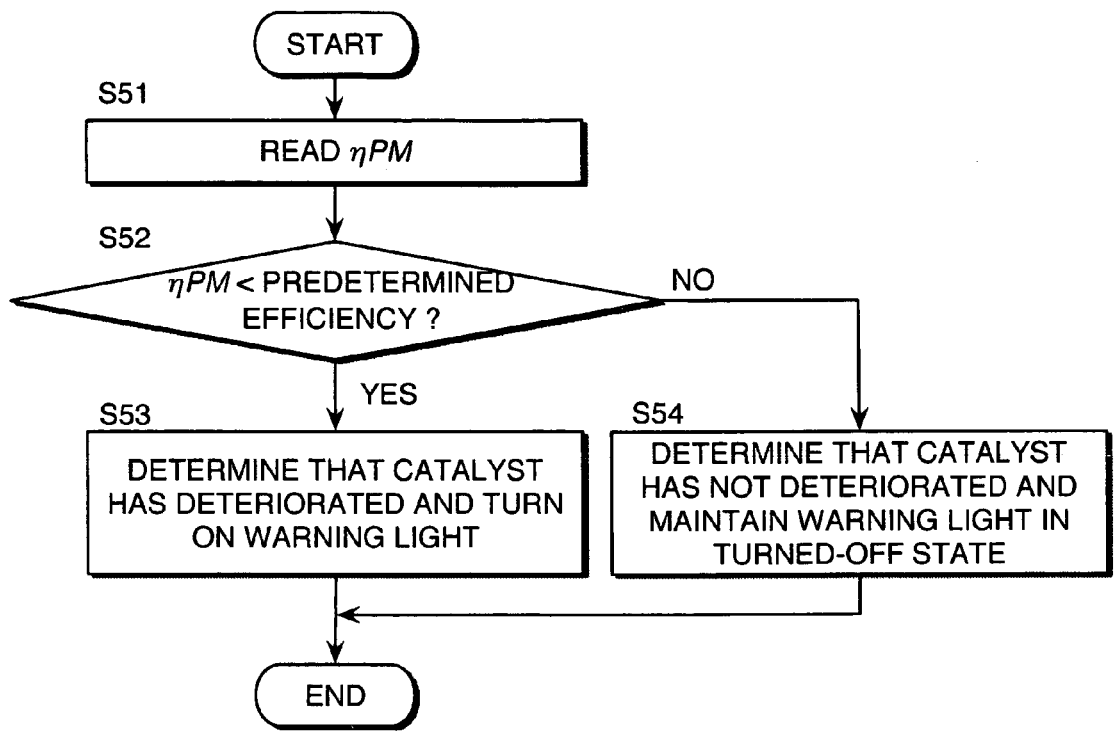
FIG. 12 is a flowchart illustrating a deterioration determination routine executed by the engine controller.

The sensors which detect the parameters required to execute the routines in FIGS. 2, 9, and 12 are not limited to the sensors described in the above embodiments, and these parameters may be obtained by any method. This invention is not dependent on a method of obtaining parameters, and may be applied to any DPF regeneration device or method which executes the claimed control using the parameters.

The embodiments of this invention in which an exclusive property or privilege is claimed are defined as follows:

What is claimed is:

1. A deterioration diagnosing device for a diesel particulate filter which traps a particulate matter contained in an exhaust gas of a diesel engine, the filter being regenerated by burning a trapped particulate matter under a predetermined temperature condition, the device comprising:
  a programmable controller programmed to:
    determine a trapped particulate matter amount at a start of a regeneration of the filter as a first amount;
    determine a particulate matter combustion amount burned within a predetermined time period from the start of the regeneration of the filter as a second amount; and
    determine a deterioration in a regeneration performance of the filter on the basis of a difference between the first amount and the second amount.

2. The diagnosing device as defined in claim 1, wherein the filter comprises an oxidation catalyst which effects an increase in a temperature of the filter during the regeneration.

3. The diagnosing device as defined in claim 1, wherein the diagnosing device further comprises a mechanism which raises a temperature of the exhaust gas, and the predetermined temperature condition is an exhaust gas temperature condition realized by the exhaust gas temperature raising mechanism on the basis of a predetermined target temperature.

4. The diagnosing device as defined in claim 3, wherein the diagnosing device further comprises a sensor which detects the temperature of the exhaust gas, and the controller is further programmed to calculate the second amount on the basis of a sum total of a time during which the temperature of the exhaust gas satisfies the predetermined target temperature.

5. The diagnosing device as defined in claim 4, wherein the sensor comprises a sensor which detects a temperature of the exhaust gas at an inlet of the filter.

6. The diagnosing device as defined in claim 4, wherein the controller is further programmed to set the second amount equal to a particulate matter combustion amount burned up to a point at which the sum total reaches a predetermined time, calculate a regeneration efficiency from a ratio of the first amount and the second amount, and determine whether or not the regeneration performance has deteriorated on the basis of the regeneration efficiency.

7. The diagnosing device as defined in claim 6, wherein the diagnosing device further comprises a warning unit which warns of the deterioration of the regeneration performance, and the controller is further programmed to turn on the warning unit when the regeneration efficiency is lower than a predetermined value.

8. A regeneration device for a diesel particulate filter which traps a particulate matter contained in an exhaust gas of a diesel engine, the filter being regenerated by burning a trapped particulate matter, the device comprising:
   a mechanism which raises a temperature of the exhaust gas to a target temperature suited for burning the particulate matter; and
   a programmable controller programmed to:
      determine a trapped particulate matter amount at a start of a regeneration of the filter as a first amount;
      determine a particulate matter combustion amount burned within a predetermined time period from the start of the regeneration of the filter as a second amount;
      calculate a deterioration factor representing a degree of deterioration in a regeneration performance of the filter on the basis of a difference between the first amount and the second amount; and
      correct the target temperature based on the deterioration factor.

9. The regeneration device as defined in claim 8, wherein the filter comprises an oxidation catalyst which effects an increase in a temperature of the filter during the regeneration.

10. The regeneration device as defined in claim 8, wherein the regeneration device further comprises a sensor which detects the temperature of the exhaust gas, and the controller is further programmed to calculate the second amount on the basis of a sum total of a time during which the temperature of the exhaust gas satisfies the target temperature.

11. The regeneration device as defined in claim 10, wherein the sensor comprises a sensor which detects a temperature of the exhaust gas at an inlet of the filter.

12. The regeneration device as defined in claim 10, wherein the controller is further programmed to set the second amount equal to a particulate matter combustion amount burned up to a point at which the sum total reaches a predetermined time, calculate a regeneration efficiency from a ratio of the first amount and the second amount, and calculate the deterioration factor on the basis of the regeneration efficiency.

13. The regeneration device as defined in claim 12, wherein the controller is further programmed to calculate the deterioration factor on the basis of a variation in an average regeneration efficiency calculated over a plurality of regenerations of the filter.

14. The regeneration device as defined in claim 8, wherein the controller is further programmed to set the target temperature to a higher value as the deterioration factor increases.

15. The regeneration device as defined in claim 8, wherein the controller is further programmed to set the target temperature to a higher value every time a predetermined amount of the particulate matter is burned.

16. The regeneration device as defined in claim 15, wherein the regeneration device further comprises a sensor which detects a temperature of the filter, and the controller is further programmed to accumulate a time during which the temperature of the filter is equal to or higher than a predetermined temperature as an effective regeneration time and determine whether or not the particulate matter combustion amount has reached the predetermined amount on the basis of the effective regeneration time.

17. The regeneration device as defined in claim 16, wherein the controller is further programmed to determine whether or not the temperature of the filter is higher than a combustible temperature of the particulate matter which is lower than the target temperature, when the temperature of the filter is lower than the target temperature, accumulate, as a supplementary time, a product of a time during which the temperature of the filter is higher than the combustible temperature and a predetermined coefficient, and determine whether or not the particulate matter combustion amount has reached the predetermined amount on the basis of a sum total of the effective regeneration time and the supplementary time.

18. The regeneration device as defined in claim 15, wherein the controller is further programmed to calculate a residual particulate amount in the filter at a start timing of an accumulation of the effective regeneration time, and set the target temperature to a higher value as the residual particulate amount decreases.

19. The regeneration device as defined in claim 18, wherein the controller is further programmed to set the target temperature to a higher value as the first amount decreases.

20. The regeneration device as defined in claim 8, wherein the exhaust gas temperature raising mechanism comprises a fuel injection device of the diesel engine.

21. The regeneration device as defined in claim 8, wherein the regeneration device further comprises a sensor which detects a differential pressure between an inlet and an outlet of the filter, and the controller is further programmed to calculate the trapped particulate matter amount in the filter on the basis of the differential pressure.

22. A deterioration diagnosing device for a diesel particulate filter which traps a particulate matter contained in an exhaust gas of a diesel engine, the filter being regenerated by burning a trapped particulate matter under a predetermined temperature condition, the device comprising:
   means for determining a trapped particulate matter amount at a start of a regeneration of the filter as a first amount;
   means for determining a particulate matter combustion amount burned within a predetermined time period from the start of the regeneration of the filter as a second amount; and
   means for determining a deterioration in a regeneration performance of the filter on the basis of a difference between the first amount and the second amount.

23. A deterioration diagnosing method for a diesel particulate filter which traps a particulate matter contained in an exhaust gas of a diesel engine, the filter being regenerated by burning a trapped particulate matter under a predetermined temperature condition, the method comprising:
- determining a trapped particulate matter amount at a start of a regeneration of the filter as a first amount;
- determining a particulate matter combustion amount burned within a predetermined time period from the start of the regeneration of the filter as a second amount; and
- determining a deterioration in a regeneration performance of the filter on the basis of a difference between the first amount and the second amount.

24. A regeneration device for a diesel particulate filter which traps a particulate matter contained in an exhaust gas of a diesel engine, the filter being regenerated by burning a trapped particulate matter, the device comprising:
- means for raising a temperature of the exhaust gas to a target temperature suited for burning the particulate matter;
- means for determining a trapped particulate matter amount at a start of a regeneration of the filter as a first amount;
- means for determining a particulate matter combustion amount burned within a predetermined time period from the start of the regeneration of the filter as a second amount;
- means for calculating a deterioration factor representing a degree of deterioration in a regeneration performance of the filter on the basis of a difference between the first amount and the second amount; and
- means for correcting the target temperature based on the deterioration factor.

25. A regeneration method for a diesel particulate filter which traps a particulate matter contained in an exhaust gas of a diesel engine, the filter being regenerated by burning a trapped particulate matter, the method comprising:
- raising a temperature of the exhaust gas to a target temperature suited for burning the particulate matter;
- determining a trapped particulate matter amount at a start of a regeneration of the filter as a first amount;
- determining a particulate matter combustion amount burned within a predetermined time period from the start of the regeneration of the filter as a second amount;
- calculating a deterioration factor representing a degree of deterioration in a regeneration performance of the filter on the basis of a difference between the first amount and the second amount; and
- correcting the target temperature based on the deterioration factor.

* * * * *